United States Patent [19]
Gratzel et al.

[11] Patent Number: 5,441,827
[45] Date of Patent: Aug. 15, 1995

[54] TRANSPARENT REGENERATING PHOTOELECTROCHEMICAL CELL

[75] Inventors: Michael Gratzel, St-Sulpice; Eric Saurer, Bevaix, both of Switzerland

[73] Assignee: Asulab S.A., Bienne, Switzerland

[21] Appl. No.: 142,407

[22] PCT Filed: Mar. 12, 1993

[86] PCT No.: PCT/CH93/00068
§ 371 Date: Dec. 30, 1993
§ 102(e) Date: Dec. 30, 1993

[87] PCT Pub. No.: WO93/19479
PCT Pub. Date: Sep. 30, 1993

[30] Foreign Application Priority Data
Mar. 26, 1992 [CH] Switzerland ............ 0962/92

[51] Int. Cl.⁶ .................................... H01M 6/36
[52] U.S. Cl. .................................... 429/111
[58] Field of Search ............................ 429/111

[56] References Cited

U.S. PATENT DOCUMENTS

| | | | |
|---|---|---|---|
| 4,117,210 | 9/1978 | Deb et al. | 429/111 |
| 4,215,155 | 7/1980 | McKinzie et al. | 427/74 |
| 4,544,470 | 10/1985 | Hetrick | 204/248 |
| 4,927,721 | 5/1990 | Grätzel et al. | 429/111 |
| 5,053,293 | 10/1991 | Yamakita et al. | 429/111 |
| 5,084,365 | 1/1992 | Grätzel et al. | 429/111 |

FOREIGN PATENT DOCUMENTS

| | | | |
|---|---|---|---|
| 033641 | 9/1989 | European Pat. Off. | 429/111 |
| 0407182 | 1/1991 | European Pat. Off. | 429/111 |
| WO91/16719 | 10/1991 | WIPO | 429/111 |

Primary Examiner—Aaron Weisstuch
Attorney, Agent, or Firm—Pollock, Vande Sande & Priddy

[57] ABSTRACT

A regenerating photoelectrochemical cell (1) is disclosed having a first transparent substrate (2) which has thereon a first transparent electrode (6), a second transparent substrate (4) which has thereon a second transparent electrode (8) on which is deposited a first layer (10) of a photoelectrochemically active semiconductor oxide in the form of a porous nanostructure of sintered colloidal particles, the substrates (2, 4) being so disposed in relation to one another as to define a space filled with electrolyte (16), said electrolyte (16) impregnating the said porous structure in a manner such that it is in contact on the one hand with the first transparent electrode (6) disposed on the first transparent substrate (2) and on the other hand with the second transparent electrode (8) disposed on the second transparent substrate (4), and said second transparent substrate also having a second compact continuous semiconductor oxide layer (20) extending between the second transparent electrode (8) and the first semiconductor oxide layer (10).

20 Claims, 1 Drawing Sheet

TRANSPARENT REGENERATING PHOTOELECTROCHEMICAL CELL

BACKGROUND OF THE INVENTION

The invention relates to a regenerating photoelectrochemical cell and, more particularly, to a cell of this type that does not absorb, or that very weakly absorbs electromagnetic radiation having wavelengths in the visible range. The term regenerating photoelectrochemical cell is generally understood to mean an electrochemical system in which the reactions at the electrodes are reversible and in which the different types of chemicals involved are preserved.

Regenerating photoelectrochemical cells of the semiconductor oxide/electrolyte interface type are already known. In these cells, the semiconductor oxide is deposited in the form of a continuous layer on a substrate previously covered with an electrode. However, the disadvantage of these cells is that they only absorb a very small proportion of the incident light, with the result that their efficiency is too low to produce a utilizable amount of energy.

PCT International Patent Application WO 91/16719 discloses a regenerating photoelectrochemical cell having a titanium dioxide layer which is produced in the form of a porous nanostructure formed of sintered colloidal particles and covered with a monomolecular layer of chromophors. Although providing a high efficiency, this cell nonetheless has the disadvantage that it absorbs a large amount of the incident light with wavelengths in the visible and ultraviolet regions. There are, however, numerous applications for which it is preferable or even essential that the cell does not absorb light in the visible range.

European patent EP 407 182 describes a photoelectrochemical cell comprising, among others, a porous membrane of semiconductor oxide formed of sintered colloidal particles and having no chromophors. The efficiency of a cell of this type is, however, not entirely satisfactory.

OBJECTS AND SUMMARY OF THE INVENTION

It is thus a main object of the invention to overcome the disadvantages of the above-mentioned prior art by providing a regenerating photoelectrochemical cell which does not diffuse incident light and which does not absorb light having wavelengths in the visible range, while still presenting a satisfactory conversion rate from incident light energy into electrical energy.

For this purpose, an object of the invention is a regenerating photoelectrochemical cell having a first transparent substrate which has a first transparent electrode, a second transparent substrate which has a second transparent electrode on which is deposited a first layer of a photoelectrochemically active semiconductor oxide in the form of a porous nanostructure formed of sintered colloidal particles, the substrates being so disposed in relation to one another as to define a space filled with electrolyte, said electrolyte impregnating said porous structure in a manner such that it is in contact on the one hand with the electrode disposed on the first substrate and on the other hand with the electrode disposed on the second substrate, characterised in that the second substrate also has a second compact continuous semiconductor oxide layer extending between the second electrode and the first semiconductor oxide layer.

The presence of this second layer substantially increases the efficiency as well as the stability of the cell according to the invention, without the need to add chromophors, with the result that a cell is obtained which is transparent to light having wavelengths in the visible range and which is non-diffusing while operating satisfactorily in various applications.

The field of application of the cell is greater than that of cells of the prior art. All the layers forming the cell of the invention are thus invisible to the naked eye.

According to one feature of the invention, the second semiconductor oxide layer is of the same material as the first semiconductor oxide layer.

The thickness of the second semiconductor oxide layer is preferably between 10 and 50 nanometers.

According to another feature of the invention, the first substrate also has an electrocatalytic layer extending between the first electrode and the electrolyte.

According to another feature of the invention, the diameter of the colloidal particles is between 1 and 200 nanometers.

This nanostructure thus makes it possible for minority carriers to reach the electrolyte/semiconductor junction before any recombination of the carriers occurs and consequently to produce an effective photoelectrochemical cell.

According to another feature, the thickness of the nanostructure is from 10 to 20,000 nanometers.

This feature, combined with the small diameter of the colloidal particles makes it possible to obtain a layer that does not diffuse light.

BRIEF DESCRIPTION OF THE DRAWINGS

Other features and advantages of the invention will appear from the reading of the description of one embodiment of the invention, given as non-limiting example with reference to the appended drawings in which.

DETAILED DESCRIPTION OF THE INVENTION

In the context of the following description, the adjective transparent is understood to mean transparent to visible light and non-diffusing light.

Figure 1:
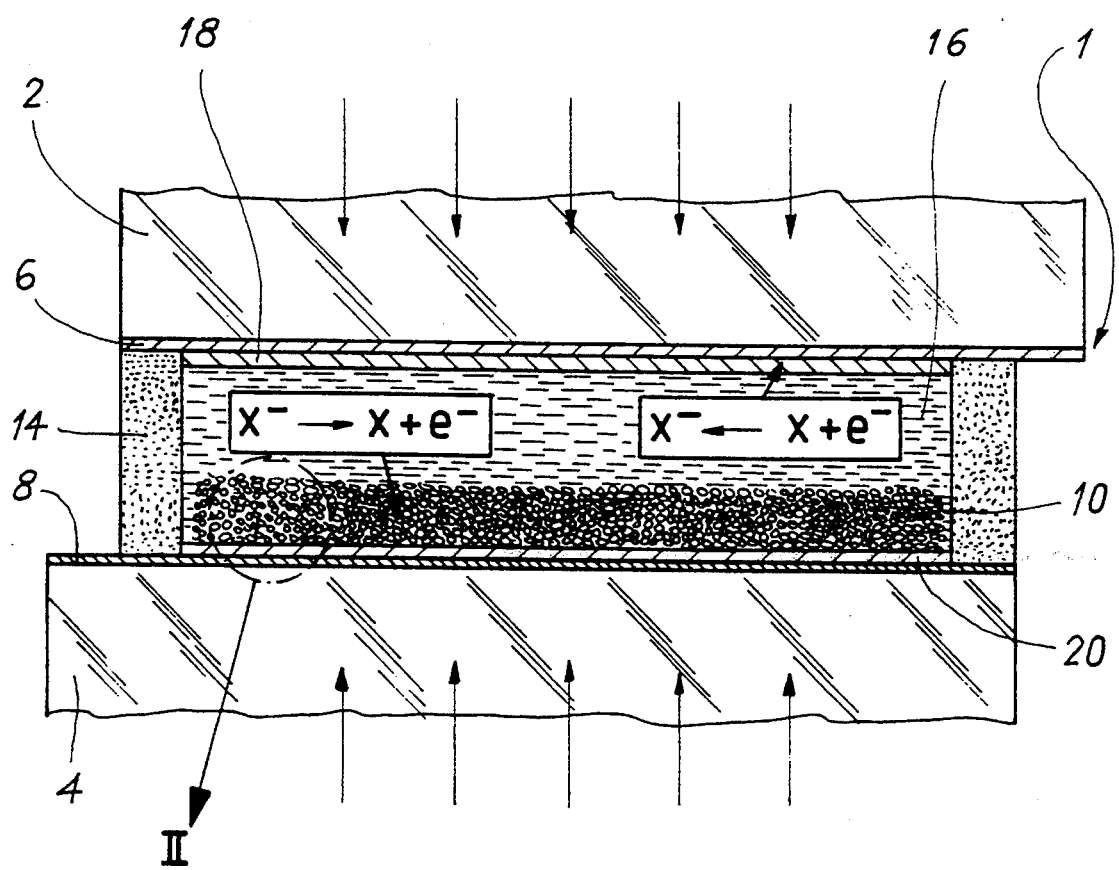
FIG. 1 shows a diagrammatic section of a regenerating photoelectrochemical cell of the invention.

FIG. 1 shows a regenerating photoelectrochemical cell designated by the general reference numeral 1.

The cell 1 comprises a first transparent, substrate 2 and a second substrate 4 that is also transparent, these two substrates having respective transparent electrodes 6 and 8 over the entire surface of their opposing faces. To simplify the description, the electrodes 6, 8 could be designated first electrode and second electrode, respectively.

These electrodes 6, 8 are preferably produced in the form of a thin layer of a mixture of indium oxide/tin oxide or tin oxide/antimony oxide. The person skilled in the art will of course be able to choose any other equivalent transparent layer.

The substrate 4 also has a first layer 10 of a photoelectrochemically active semiconductor oxide made in the form of a porous nanostructure formed of sintered colloidal particles 12 which will be described in greater detail hereinafter.

The substrates 2 and 4 are joined together, for example, by a sealing frame 14 to define a space filled with an electrolyte 16 which comprises a redox couple in a conventional manner, and which impregnates the porous structure 10 in such a manner that the semiconductor electrolyte oxide interface has a very large effective surface.

According to the invention, the electrode 8 is covered with a second continuous and compact layer 20 of a semiconductor oxide.

The second semiconductor oxide layer 20 thus extends between the second electrode 8 and the first semiconductor oxide layer 10.

The continuous compact semiconductor oxide layer 20 makes it possible to limit or avoid any short circuit which could occur on the second electrode 8 between the oxidized and reduced forms of the redox couple contained in the electrolyte 16 and thereby to increase the voltage available to the terminals of the electrodes of the cell.

In the example shown, the electrode 6 is also covered with an electrocatalytic layer 18 which extends between the electrode 6 and the electrolyte 16.

The electrocatalytic layer 18 makes it possible to reduce the overvoltage for the reduction of the oxidised form of the redox couple contained in the electrolyte 16 and to improve the overall performance of the cell.

The electrocatalytic layer 18 may for example be deposited by the galvanic route or by deposition in a vacuum, and the semiconductor oxide layer 20 may, in turn, be for example deposited by chemical or physical vapor phase deposition.

It will be noted that the drawing does not reflect the exact dimensions of the cell formed in this manner, these dimensions being greatly exaggerated for reasons of clarity.

Figure 2:
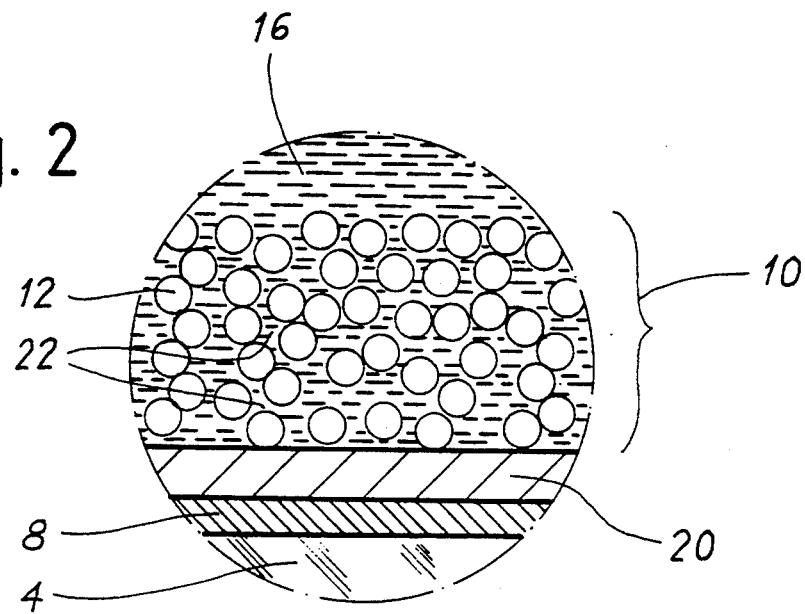
FIG. 2 is a partially enlarged view of the cell of FIG. 1.

Referring also to FIG. 2, this shows that the layer 10 has pores 22 formed by the spaces present between the particles 12 of the semiconductor oxide. These pores 22 are interconnected between each other and are filled with the electrolyte 16 in such a way that percolation of the latter through the layer 10 is easily effected.

The colloidal particles 12 are preferably 1 to 200 nanometers in diameter and form a layer between 10 and 20,000 nanometers thick at the surface of the substrate 4. This consequently leads to the production of a layer 10 presenting a very high effective surface, that is a layer, the real surface/projected surface of which is of the order of 2000.

It will be noted in this connection that the small size of the particles 12, in connection with the small thickness of the layer 10, has the advantage of yielding a layer 10 which does not diffuse light.

Moreover, the size of the particles 12 and the thickness of the layer 10 have a large influence on the response of the layer 10 to incident light excitation.

As a matter of fact, the particles 12 of the layer 10 absorb photons, the energy of which is equal to or exceeds the energy difference between the conduction band and the valency band. The absorption of light, symbolised by arrows in the drawing, thus leads to the creation of electron-hole pairs in the particles 12, contrary to the particles covered with a film of chromophors of the prior art, wherein the incident light is absorbed by the chromophor and not by the semiconductor oxide. In this case, the electrons are transferred from the excitation levels of the chromophors into the conduction band of the semiconductor oxide, the corresponding positive charges associated with the chromophors being trapped in the surface of the semiconductor, thereby provoking separation of the charges, resulting in the desired photovoltaic effect. In the case of a semiconductor oxide of the n type, such as $TiO_2$, the electrons are majority carriers whereas the holes are the minority carriers. Thus, when a semiconductor/electrolyte device of this type is used to create electricity from absorbed light, it is necessary for the holes to diffuse up to the semiconductor/electrolyte junction before recombination with the electrons can occur. In other words, the length of diffusion of the minority carriers, designated lpm, must be longer than the distance which these carriers have to travel before reaching the junction. This diffusion length is defined by $$lpm = (2D\tau)^{0.5}$$

in which $\tau$ is the lifetime of a hole and D is the diffusion constant of the minority carrier. By way of example, the value of lpm is 100 nanometers for $TiO_2$.

According to the invention, a layer of semiconductor oxide 10 is thus produced formed of an agglomeration of colloidal particles 12, the diameter of which is smaller than the diffusion length of the minority charge carriers in such a manner that there is a high probability of these carriers reaching the semiconductor/electrolyte junction and obtaining effective separation of the charge carriers and therefore to increase conversion efficiency.

For the deposition of the layer 10, reference may for example be made to the deposition process for a layer of this type described in PCT International Patent Application WO 91/16719.

The semiconductor oxide forming the layer 10 may be selected from the semiconductor oxides included in the following three groups.

The first group comprises oxides of the transition elements, oxides of the elements of columns 13 and 14 of the modern periodic classification table (see Cours de chimie physique by Paul Arnaud, published by Dunod 1988), and rare earth oxides.

The second group comprises mixed oxides comprising a mixture formed of two or more oxides of the first group.

The third group comprises mixed oxides comprising a mixture formed of one or more oxides of the first group with oxides of the elements of columns 1 and 2 of the modern periodic classification table.

The semiconductor oxide forming the layer 10 is preferably selected from the group of materials comprising $TiO_2$, $La_2O_3$, $ZrO_2$, $Nb_2O_5$, $WO_3$, $SrTiO_3$, $CaTiO_3$, sodium titanate, and potassium niobiate.

According to a special embodiment of the invention, the electrolyte 16 may be a liquid electrolyte and may preferably be selected from the electrolytes comprising a redox couple composed of cerium(III) sulfate and cerium(IV), sodium bromide and bromine, as well as lithium iodide and iodine in solution in one of the solvents selected from the group comprising water, N-methyloxazolidinone, nitromethane, propylene carbonate, ethylene carbonate, butyrolactone, dimethyl imidazolidine, N-methylpyrrolidine, or in a mixture of these solvents.

The oxidation and reduction reactions of the components present in the electrolyte have been symbolically represented in the drawing at the level of the interfaces electrolyte 16/electrocatalytic layer 18 and electrolyte 16/semiconductor oxide layer 10.

According to another embodiment, the electrolyte 16 may also be solid, and in this case a polymer electrolyte such as polyoxyethylene/LiI may be selected.

According to a variant of the embodiment comprising a solid electrolyte, the electrolyte 16 is preferably lithium iodide and pyridinium iodide.

The electrocatalytic layer 18 is preferably a transparent film formed of one to ten monomolecular layers of a metal selected from the group of metals comprising platinum, ruthenium, rhodium, palladium, iridium, osmium, and conducting oxides of the elements of columns 8 to 10 of the modern periodic classification table. The second semiconductor oxide layer 20 is advantageously of the same material as the first layer 10.

We claim:

1. A regenerating photoelectrochemical cell comprising a first transparent substrate which has thereon a first transparent electrode, and a second transparent substrate which has thereon a second transparent electrode on which is deposited a first layer of a photoelectrochemically active semiconductor oxide in the form of a porous nanostructure of sintered colloidal particles, said substrates being so disposed in relation to one another as to define a space filled with electrolyte, said electrolyte impregnating said porous structure in a manner such that it is in electrical contact on the one hand with the first transparent electrode disposed on the first transparent substrate and on the other hand with the second transparent electrode disposed on the second transparent substrate, and said second transparent substrate also having thereon a second semiconductor oxide layer which is compact, continuous, and extends between the second electrode and the first semiconductor oxide layer.

2. A cell according to claim 1, wherein the second semiconductor oxide layer is of the same material as the first semiconductor oxide layer.

3. A cell according to claim 2, wherein the colloidal particles forming the first semiconductor oxide layer have a diameter which is smaller than the diffusion length of minority charge carriers.

4. A cell according to claim 1, wherein the second semiconductor oxide layer has a thickness in the range of 10 to 50 nanometers.

5. A cell according to claim 4, wherein the colloidal particles forming the first semiconductor oxide layer have a diameter which is smaller than the diffusion length of minority charge carriers.

6. A cell according to claim 1, wherein the first transparent substrate also has thereon an electrocatalytic layer extending between the first transparent electrode and the electrolyte.

7. A cell according to claim 6, wherein the electrocatalytic layer is made up of a plurality of monomolecular layers of a material selected from the group consisting of the metals platinum, ruthenium, rhodium, palladium, iridium and osmium, and the conducting oxides of the elements of columns 8 to 10 of the modern periodic classification table.

8. A cell according to claim 7, wherein the colloidal particles forming the first semiconductor oxide layer have a diameter which is smaller than the diffusion length of minority charge carriers.

9. A cell according to claim 6, wherein the colloidal particles forming the first semiconductor oxide layer have a diameter which is smaller than the diffusion length of minority charge carriers.

10. A cell according to claim 1, wherein the colloidal particles forming the first semiconductor oxide layer have a diameter in the range of 1 to 200 nanometers.

11. A cell according to claim 1, wherein the porous structure has a thickness in the range of 10 to 20,000 nanometers.

12. A cell according to claim 1, wherein the materials of the semiconductor oxide layers are selected from semiconductor oxides of a first group consisting of the oxides of the transition elements, the oxides of the elements of columns 13 and 14 of the modern periodic classification table and the oxides of rare earth metals, of a second group consisting of mixed oxides formed of a mixture of two or more oxides of the first group, and of a third group consisting of mixed oxides formed of a mixture of one or more oxides of the first group with the oxides of the elements of columns 1 and 2 of the modern periodic classification table.

13. A cell according to claim 12, wherein the semiconductor oxide materials are selected from the group consisting of $TiO_2$, $La_2O_3$, $ZrO_2$, $Nb_2O_5$, $WO_3$, $SrTiO_3$, $CaTiO_3$, sodium titanate, and potassium niobiate.

14. A cell according to claim 13, wherein the colloidal particles forming the first semiconductor oxide layer have a diameter which is smaller than the diffusion length of minority charge carriers.

15. A cell according to claim 1, wherein the electrolyte is a liquid electrolyte selected from the group of electrolytes consisting of a redox couple of cerium(III) sulfate and cerium(IV), a redox couple of sodium bromide and bromine, and a redox couple of lithium iodide and iodine in solution in one or more solvents selected from the group consisting of water, Nmethyloxazolidinone, nitromethane, propylene carbonate, ethylene carbonate, butyrolactone, dimethyl imidazolidine, N-methylpyrrolidine, and a mixture of said solvents.

16. A cell according to claim 1, wherein the electrolyte is a solid.

17. A cell according to claim 16, wherein the electrolyte comprises a polymer electrolyte.

18. A cell according to claim 17, wherein the electrolyte comprises polyoxyethylene/LiI.

19. A cell according to claim 16, wherein the electrolyte comprises lithium iodide and pyridinium iodide.

20. A cell according to claim 1, wherein the colloidal particles forming the first semiconductor oxide layer have a diameter which is smaller than the diffusion length of minority charge carriers.

* * * * *